United States Patent [19]
Adams

[11] 3,789,340
[45] Jan. 29, 1974

[54] THERMAL SENSING DEVICE FOR CONTROL CIRCUITS

[75] Inventor: Jay C. Adams, Columbus, Ohio

[73] Assignee: Ranco Incorporated, Columbus, Ohio

[22] Filed: July 17, 1972

[21] Appl. No.: 272,316

[52] U.S. Cl.................. 338/28, 73/362 AR, 338/22
[51] Int. Cl.............................................. H01c 7/00
[58] Field of Search..... 338/28, 22, 23, 25, 26, 229; 73/349, 351, 362.8

[56] References Cited
UNITED STATES PATENTS
| | | | |
|---|---|---|---|
| 3,357,249 | 12/1967 | Bernous et al. | 73/351 |
| 2,484,585 | 10/1949 | Quinn | 338/25 |
| 3,123,790 | 3/1964 | Tyler | 338/28 |
| 3,406,366 | 10/1968 | Kontrimas et al. | 338/25 |

Primary Examiner—C. L. Albritton
Attorney, Agent, or Firm—Watts, Hoffman, Fisher & Heinke, Co.

[57] ABSTRACT

A thermal sensor for application to the exterior of a tube or the like comprises a thermistor supported within a rectangular casing, one end of which is urged by a spring into engagement with the tube. The portion of the casing engaging the tube comprises a heat transfer member having a surface contoured to extensively engage a portion of the tube and having a pair of legs extending inwardly of the casing and straddling the thermistor which is held in a cage-like structure in the interior of the casing. A thermal conducting cement fills voids between the thermistor and the heat transfer member.

11 Claims, 5 Drawing Figures

PATENTED JAN 29 1974  3,789,340

THERMAL SENSING DEVICE FOR CONTROL CIRCUITS

Background of the Invention

The present invention relates to temperature responsive control apparatus of the type employing a relatively small size sensor element, such as a thermistor, for sensing the temperature of a fluid container. In utilizing control apparatus of the type mentioned to regulate the speed of an electric motor driven fan for cooling the condenser of a refrigerating system, for example, a problem is presented in the application of the thermistor to the condenser so as to sense temperature changes rapidly. One prominent solution to the problem has been to open the wall of the condenser tubing and insert the thermistor inside the tubing and provide a seal between the circuit wire and the wall of the tubing. This method is undesirable in that it is relatively expensive and subjects the refrigerating system to the hazard of leaks and the attendant disadvantages thereof.

The Present Invention

The present invention provides a device for conveniently attaching a relatively small temperature sensing element in close heat exchange relation with the exterior of tubing of a refrigerating system or the like, so that the sensing element will respond rapidly to temperature changes of the fluid in the tubing. The sensing device may be readily attached to the tubing without cutting the walls or otherwise disturbing the integrity of systems comprised of the tubing and the thermistor and the lead wires therefor are well protected and are conveniently available for connection in a control circuit.

The invention also contemplates a casing for supporting and enclosing the thermistor which can be formed by nesting two identical casing members together.

Other objects and advantages of the invention will be apparent from the following description of a preferred form of the invention, reference being made to the accompanying drawings wherein.

Figures 1, 2, 4:
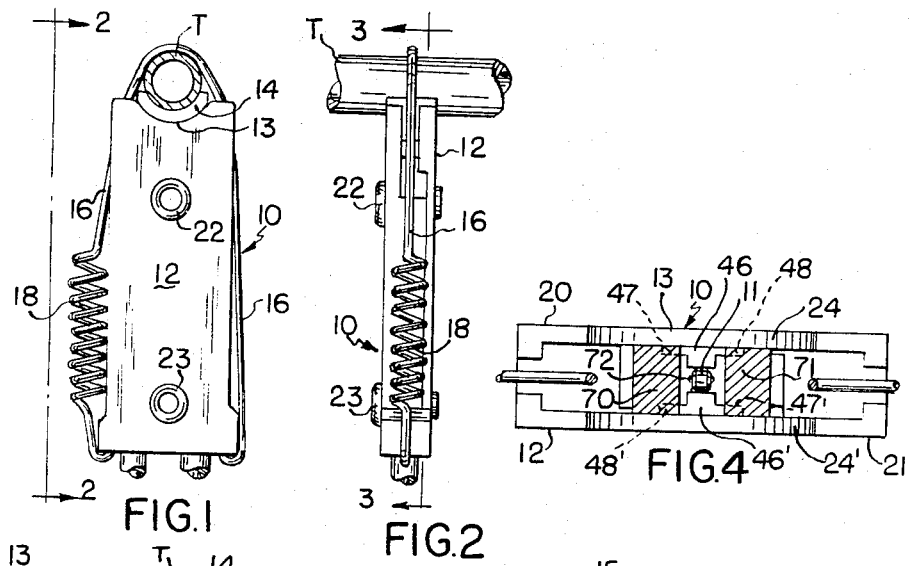
FIG. 1 is a front elevational view of a thermal sensing device attached to a refrigerant condenser tube for sensing the temperature of the refrigerant in the condenser.
FIG. 2 is a side view of the sensing device shown in FIG. 1 taken along line 2—2 of FIG. 1.
FIG. 4 is a sectional view taken substantially along line 4—4 of FIG. 3.

Referring to the drawings, a temperature device 10 is shown for securing a thermistor 11 in close heat transfer relation with a pipe or tubing T. The sensing device 10 may form a component of an electronic control circuit for controlling the speed of a fan for circulating air over the condenser, for example. The control circuit is not shown as it is not essential to the understanding of this invention.

The sensing device 10 comprises a casing 12, one end 13 of which is concave and receives a heat transfer member 14. The member 14 has a semicylindrical portion 15 which is adapted to engage the exterior of the tubing T, and the inside diameter of the semicylindrical portion corresponds to the outside diameter of the tube so that a substantial area of the member 14 may be maintained in contact with the outside wall of the tubing. The sensing device 10 is secured to the tubing T with the member 14 in contact with the tubing, as just described, by a spring clip 16. The clip 16 comprises a spring wire having hooked ends which engage in recesses 17 at opposite sides of the lower end of the casing 12, as viewed in FIG. 3. The intermediate portion of the clip overlies the tubing T and a coil 18 formed by the wire maintains a tension which urges the casing 12 to the tubing.

Figures 3, 5:
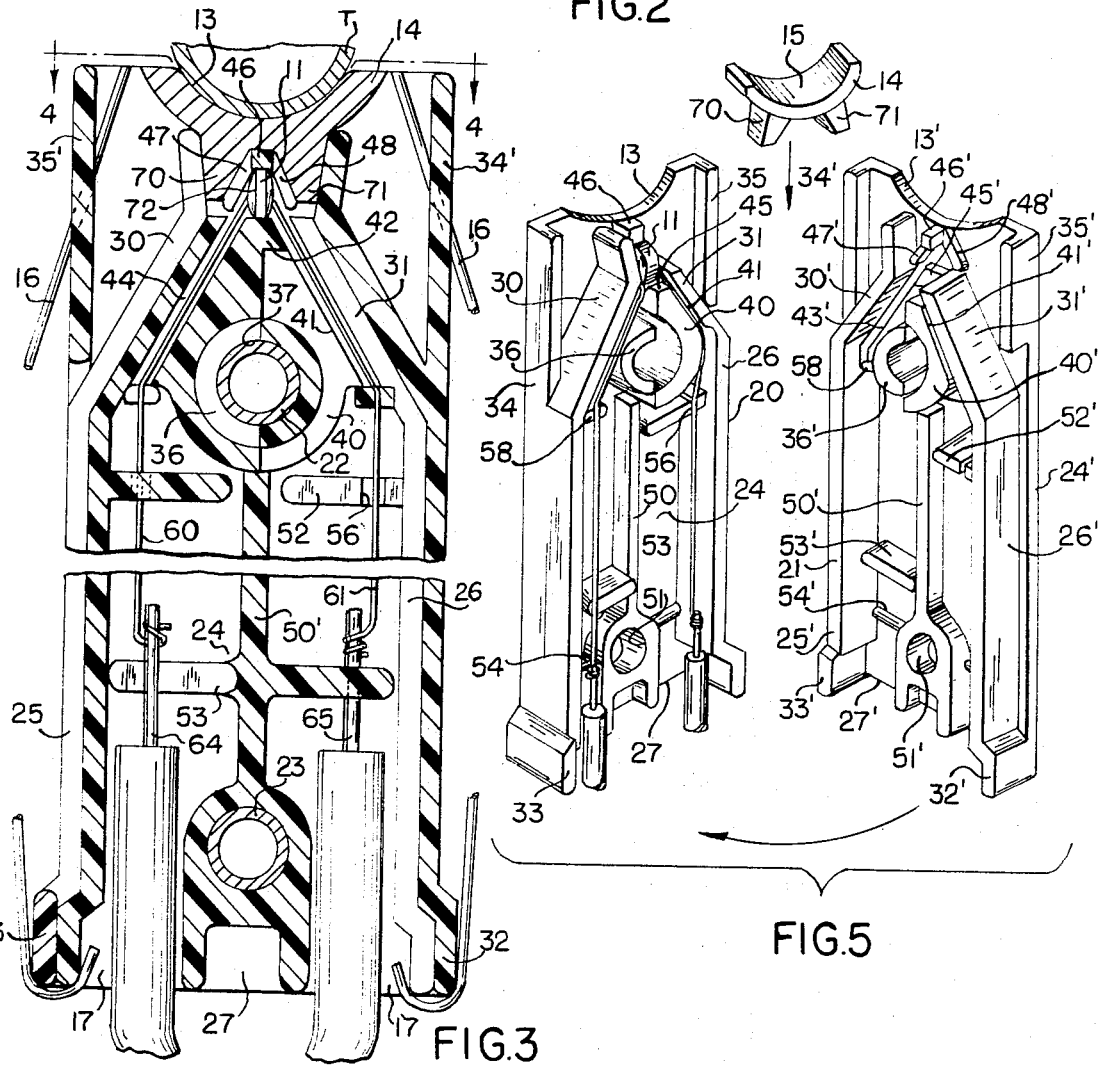
FIG. 3 is a fragmentary sectional view of the sensing device taken substantially along line 3—3 of FIG. 2 and on a larger scale.
FIG. 5 is an exploded elevational view of disassembled components of the sensing device.

The casing 12 is comprised of two identical open box-like molded members 20,21 which are secured in nesting relationship by rivets 22, 23. For sake of clarity, the parts of the casing member 21 which correspond to like parts of the casing 20 are designated by the same reference characters having a prime added thereto. Referring more specifically to casing member 20 as shown in FIGS. 3, 4 and 5, the member comprises a generally rectangular side panel 24 having the semicylindrical recess 13 at the upper end. Two side walls 25,26 are formed integral with the panel 24 and extend from the bottom edge 27 upwardly, as viewed in the drawings. A portion 30 of the wall 25 angles inwardly as does the portion 31 of wall 26. The wall portion 30 turns upwardly and extends to the edge 13. The upper end of wall portion 31 terminates short of the edge 13. The section of the wall 26 which extends parallel to the side edges of the panel 24 is inset from the adjacent edge of the panel the distance of the thickness of the side wall 25 except at the lower end portion 32 which is offset flush with the edge of the panel. The section of the wall 25 which extends parallel to the side of the panel 24 is flush with the adjacent edge of the panel 24. The lower end portion of the wall 25 is offset the width of wall 26 as seen at 33. A shallow upper side wall 34 forms a continuation of the wall 25 from the angled portion 30 and terminates at the upper edge of the panel 24. A second shallow wall section 35 on the side of the panel 24 opposite the wall 34 extends from the upper edge of the panel and terminates short of the turned-in portion 31 of wall 26. The wall 34 is flush with the adjacent side edge of the panel.

A semicylindrical wall 36 extends inwardly from the panel 24 and partially surrounds a hole 37 through the panel for receiving the rivet 22. A second semicylindrical wall section 40 extends from the panel 24 opposite the wall 36. The inside of the semicylindrical portion of wall 40 is spaced from the hole 37 the thickness of the wall 36. One side 41 of the wall 40 is straight and is parallel to the inside of the wall portion 31. The upper end of the side 41 terminates to form a shoulder 42.

A narrow wall or flange 43 projects from the panel 24 and is spaced from the wall part 30 to form a channel 44 of the same width as the thickness of the wall part 31. A bridge member 45 is formed between the upper end of the wall 43 and the shoulder 42. The dimension of the bridge member 45 from the surface of panel 24 outwardly from the panel is somewhat less than one-half the similar dimension of the shoulder 42.

A lug 46 is formed on the center line of the panel 24 and has its upper edge flush with the edge 13 of the panel. Two short diverging ribs 47,48 extend on either side of the lug.

The panel 24 has a longitudinally extending central rib 50. The lower portion of the rib 50 is widened and has an opening 51 therethrough through which the rivet 23 extends. Transversely extending ribs 52, 53, 54, 55 lend reinforcement to the panel 24. The rib 52 extends from the side wall 26 and terminates short of the rib 50. A notch 56 in the rib 52 forms a guide for a lead wire of the thermistor 11 described hereinafter. The rib 53 extends laterally from rib 50 and terminates short of the side wall 25 to accommodate a second lead wire of thermistor 11. The lower end of the wall 43 has an enlargement having a notch 58 which forms a second guide for a thermistor lead wire.

The thermistor 11 is of conventional form, comprising a disc shaped body having terminal wires 60,61 attached to opposite faces. The ends of the wires 60,61 are soldered to insulated lead wires 64,65, respectively.

When the sensing device is to be assembled, the thermistor 11 is first placed in the casing 20 between the shoulders 45 and 46 and disposed with its circular surfaces facing opposite sides of the casing member. The wire 60 is laid in the channel 44 and is lodged in the notch 58. The lead wire 64 lies across the rib 53 and the insulated portion of the wire 60 extends from the bottom of the casing member and lies between the side wall 25 and the enlarged portion of the rib 50. The wire 61 is laid in the channel formed by the wall sections 31 and 41 and is lodged in the notch 56. The insulated portion of wire 65 extends from the lower end of the casing member and lies between the side wall 26 and the lower enlarged end of the rib 50. The open side of cover member 21 is then brought face to face with the cover member 20 with the edges of the holes 37,37' and 51,51' in alignment. The casing members are then moved into nesting relationship so that the side wall 25 will lie alongside the outer side of the side wall 26' with its outer edge approximately abutting the outer edge portion of the panel 24'. The side wall 25' of casing member 21 then lies alongside the side wall 26 and its outer edge lies along the outer edge of the panel 24. The portions 31' and 32' of the wall 26' nest with the portions 30,33 of the wall 25. Likewise, the portions 31,32 of the wall 26 nest with the portions 30',33' of the wall 25'. The confronting edges of the pairs of flanges 34,35' and 34',35 are spaced and form slots to receive the spring 16 when it is applied to the casing when the sensing device is installed on a condenser.

The semicylindrical wall 36 nests inside the semicylindrical wall 40' and the semicylindrical wall 36' nests inside the semicylindrical wall 40. These semicylindrical walls cooperate to form bushings through which the rivets 22,23 are inserted and crimped to secure the two casing members together. The bridge members 42,42', the lugs 46,46', the ribs 47,47', 48,48' cooperate to form a cage for capturing the thermistor 11.

When the casing members 20,21 are secured together, the wire 60 will be held in notch 56' of the rib 52'. The uninsulated portion of wire 64 will overlie the rib 53 and the uninsulated portion of the wire 65 will underlie the rib 53' as viewed in FIG. 3.

The wires 64,65 may have terminals, not shown, for connection in the fan control circuit.

After the casing is assmebled as described, the heat transfer member 14 is inserted into the upper end of the casing. The heat transfer member 14 has a pair of legs 70,71 which project from the convex side thereof and are formed to be received between the wall portions 32,32' and the ribs 47,48 and 47',48'. A body of suitable heat conducting cement 72 is disposed between the circular faces of the thermistor 11 and the adjacent leg of the member 14. Preferably, the cement in a viscous form is conveniently injected onto opposite faces of the thermistor and the member 14 is positioned in nesting relation in the received portion 13, as shown. The legs, 70, 71 displace a portion of the cement, which flows about the thermistor and into the voids of the structure forming the cage about the thermistor. The cement also adheres to the surfaces of the legs 70,71. Preferably, the cement is an epoxy with aluminum powder filler. The cement is then cured and solidifies to secure the thermistor in place and provide a good heat transfer body between the legs of the member 14 and the thermistor.

It will be seen that when the assembled casing 21 is applied to the tube T as shown and described, a rapid heat transfer is effected between the walls of the tube and the transistor. The casing provides a convenient handling agency for the transistor as well as mechanical and electrical shielding thereof.

I claim:

1. A temperature sensing device comprisigng a casing having an opening in one end, said casing comprising two similar open box-like casing members and means securing said casing members together with the open sides thereof facing toward the other casing member, a heat conducting member disposed in said opening and comprising a portion having a substantial surface exposed at said one end of said casing and having spaced projections extending into said casing, a temperature sensitive element in said casing adjacent said opening, each casing member having projections from a wall thereof forming shoulders, said shoulders cooperating to retain said element in said casing, and means in said casing for positioning said element between two of said projections on said heat conducting member.

2. A temperature sensing device as defined in Claim 1 further characterized by a body of heat conducting cement interconnecting said element and said projections on said heat conducting member.

3. A temperature sensing device comprising a casing comprising a generally rectangular body having a concave end portion defining an opening, a heat conducting member disposed in said opening and comprising a semicylindrical portion nested in said concave end portion of said casing and having a substantial surface exposed at said casing end portion, said heat conducting member comprising spaced projections extending into said casing, a temperature sensitive element in said casing adjacent said opening, means in said casing for positioning said element between two of said projections on said member, and spring means engaging said casing and adapted to urge said casing in a direction to maintain said heat conducting member in engagement with an object at said casing end portion.

4. A temperature sensing device comprising a casing having an opening in one end, a heat conducting member disposed in said opening and comprising a portion having a substantial surface exposed at said one end of said casing and having spaced projections extending into said casing, a disc-shaped temperature sensitive element in said casing adjacent said opening, means in said casing for positioning said element between two of said projections on said member, said element having terminal wires extending from opposite faces, and said casing comprising wall members forming guide channels for said terminal wires, respectively.

5. In a device for sensing the temperature of an object:
   a. a support casing;
   b. a temperature sensitive element disposed in said casing and defining at least two major surfaces;
   c. a heat conducting member supported by said casing and comprising:
      i. a first heat transfer face extending along an external side of said casing and configured to provide for heat transfer relationship with the object;
      ii. at least second and third heat transfer faces extending into said casing and closely adjacent respective ones of said major surfaces of said temperature sensitive element to provide for heat transfer between said second and third heat transfer faces and said respective major surfaces;
      iii. said heat conducting member constructed to provide for relatively low impedance conductive heat flow between said first heat transfer face and said second and third heat transfer faces; and,
   d. support means for supporting said casing with said first heat transfer face in heat exchange relationship with the object.

6. The device as claimed in claim 5 wherein said heat sensitive element is electrically conductive and has electrical properties which change in response to changes in temperature of said element and further comprising insulating means for electrically insulating said major surfaces from said second and third heat transfer faces without substantially impeding heat transfer therebetween.

7. The device claimed in claim 5 wherein said at least two major surfaces of said temperature sensitive member and said second and third heat transfer faces extend in directions generally transverse to said first heat transfer face of said heat conductive member.

8. The device claimed in claim 7 wherein said temperature sensitive element is generally disc-shaped and said heat conducting member includes projecting portions on which said second and third heat transfer faces are defined.

9. The device claimed in claim 8 wherein said heat sensitive element is formed at least in part by material having an electrical impedance which varies in accordance with changes in the temperature of the material and further comprising electrical conductors electrically connected to said element and extending from said casing and heat conducting electrical insulating means interposed between said element and conductors and said heat conducting member.

10. The device claimed in claim 9 wherein said first heat tranfer face includes at least a portion which is shaped to conform to a portion of the object and said support means comprises a resilient member reacting between said device and the object to resiliently maintain said first heat transfer face portion in heat conducting contact with the surface portion of the object.

11. The device claimed in claim 5 wherein said first heat transfer face includes at least a portion which is shaped to conform to a portion of the object and said support means comprises a resilient member reacting between said device and the object to resiliently maintain said first heat transfer face portion in heat conducting contact with the surface portion of the object.

* * * * *